(12) United States Patent
Berry et al.

(10) Patent No.: US 11,939,878 B1
(45) Date of Patent: Mar. 26, 2024

(54) TURBOMACHINE COMPONENT HAVING SELF-BREAKING SUPPORTS

(71) Applicant: General Electric Company, Schenectady, NY (US)

(72) Inventors: Jonathan Dwight Berry, Simpsonville, SC (US); Emily Kaufman, Greenville, SC (US); Clay Thomas Griffis, Greenville, SC (US); Bailey Basso, Greenville, SC (US); Archie Lee Swanner, Jr., Easley, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/081,924

(22) Filed: Dec. 15, 2022

(51) Int. Cl.
| | | |
|---|---|---|
| *F01D 21/04* | (2006.01) | |
| *B22F 10/28* | (2021.01) | |
| *B33Y 10/00* | (2015.01) | |
| *B33Y 80/00* | (2015.01) | |
| *F01D 9/02* | (2006.01) | |
| *F23D 14/02* | (2006.01) | |

(52) U.S. Cl.
CPC ............ *F01D 21/045* (2013.01); *B22F 10/28* (2021.01); *F01D 9/02* (2013.01); *F23D 14/02* (2013.01); *B33Y 10/00* (2014.12); *B33Y 80/00* (2014.12)

(58) Field of Classification Search
CPC .. B22F 10/28; B22F 10/64; B22F 5/00; B22F 5/009; B22F 5/04; B33Y 10/00; B33Y 80/00; B33Y 50/02; F02C 7/22; F05D 2230/00; F05D 2220/32
See application file for complete search history.

(56) References Cited

U.S. PATENT DOCUMENTS

| | | | |
|---|---|---|---|
| 7,388,109 B2 | 6/2008 | Machhammer et al. | |
| 7,785,544 B2 | 8/2010 | Alward et al. | |
| 10,220,576 B2 | 3/2019 | Szwedka | |
| 10,549,478 B2 | 2/2020 | Alcantara Marte et al. | |
| 10,688,722 B2 | 6/2020 | Buller et al. | |
| 10,689,196 B2 | 6/2020 | Medoff et al. | |
| 10,731,565 B2 * | 8/2020 | Purcell | B22F 10/28 |
| 11,293,641 B2 | 4/2022 | Purcell et al. | |
| 11,434,772 B2 * | 9/2022 | Griffis | B22F 10/28 |

(Continued)

FOREIGN PATENT DOCUMENTS

| | | |
|---|---|---|
| CN | 1980879 B | 3/2011 |
| CN | 103071666 B | 5/2013 |

(Continued)

*Primary Examiner* — Anthony Ayala Delgado
(74) *Attorney, Agent, or Firm* — Dority & Manning, P.A.

(57) ABSTRACT

A turbomachine component is provided. The turbomachine component formed from an additive manufacturing system. The additive manufacturing system defines an axial build direction, a radial direction, and a circumferential direction. The turbomachine component includes an exterior portion. The exterior portion includes a first end wall, a second end wall, and an outer band extending axially between the first end wall and the second end wall. The turbomachine component further includes an interior portion disposed within the exterior portion. The interior portion includes a self-breaking inner band extending axially between the first end wall and the second end wall. The self-breaking inner band includes a plurality of teeth disposed between the first end wall and the second end wall.

17 Claims, 10 Drawing Sheets

(56) References Cited

U.S. PATENT DOCUMENTS

| | | |
|---|---|---|
| 2017/0173262 A1 | 6/2017 | Veltz |
| 2017/0276363 A1 | 9/2017 | Berry et al. |
| 2018/0111334 A1 | 4/2018 | Gold et al. |
| 2018/0326495 A1* | 11/2018 | Dreano .................. B22F 10/28 |
| 2019/0047222 A1 | 2/2019 | Torrealba et al. |
| 2019/0154345 A1 | 5/2019 | Martinez et al. |
| 2020/0139436 A1* | 5/2020 | Lehmann ............... B33Y 80/00 |
| 2020/0139635 A1* | 5/2020 | Stevenson ............. B33Y 10/00 |
| 2020/0182069 A1 | 6/2020 | Spangler et al. |
| 2020/0370001 A1 | 11/2020 | Constantz et al. |
| 2022/0098992 A1* | 3/2022 | Griffis ...................... F23R 3/42 |

FOREIGN PATENT DOCUMENTS

| | | |
|---|---|---|
| EP | 3536445 A1 | 8/2020 |
| EP | 3695924 A1 | 8/2020 |
| JP | 6329952 B2 | 5/2018 |
| JP | 2019507236 A | 3/2019 |
| JP | 2019058907 A | 4/2019 |
| WO | WO2019/050518 A1 | 3/2019 |
| WO | WO2019/186603 A1 | 10/2019 |

\* cited by examiner

TURBOMACHINE COMPONENT HAVING SELF-BREAKING SUPPORTS

FIELD

The present disclosure relates generally to a turbomachine component having a self-breaking support. More particularly, the present disclosure relates to a turbomachine component having an exterior portion and an interior portion connected by a self-breaking support.

BACKGROUND

Turbomachines are widely utilized in fields such as power generation. For example, a conventional gas turbine system includes a compressor section, a combustor section, and a turbine section. The compressor section is configured to compress air as the air flows through the compressor section. The air is then directed from the compressor section to the combustor section, where it is mixed with fuel and combusted, generating a hot gas flow. The hot gas flow is provided to the turbine section, which extracts energy from the hot gas flow to power the compressor, an electrical generator, and/or other various loads. Due to the complex shapes and internal geometries of many turbomachine components, an additive manufacturing process may be utilized in order to properly fabricate the components within the tight design tolerances. For example, in a typical turbomachine, one or more rotor blades, shrouds, airfoils, fuel nozzles, and/or combustion components or subcomponents may be manufactured using an additive manufacturing process.

Additive manufacturing processes generally involve the buildup of one or more materials to make a net or near net shape (NNS) object, in contrast to subtractive manufacturing methods. Though "additive manufacturing" is an industry standard term, additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer aided design (CAD) model.

Laser sintering or melting is a notable additive manufacturing process for rapid fabrication of functional prototypes and tools. Applications include direct manufacturing of complex workpieces, patterns for investment casting, metal molds for injection molding and die casting, and molds and cores for sand casting. Fabrication of prototype objects to facilitate testing of concepts during the design cycle is another common usage of additive manufacturing processes.

Selective laser sintering, direct laser sintering, selective laser melting, and direct laser melting are common industry terms used to refer to producing three-dimensional (3D) objects by using a laser beam to sinter or melt a fine powder in successive layers to build a three-dimensional object in which particles of the powder material are bonded together. More accurately, sintering entails fusing (agglomerating) particles of a powder at a temperature below the melting point of the powder material, whereas melting entails fully melting particles of a powder to form a solid homogeneous mass. Whereas laser-based additive manufacturing can be applied to different material systems (e.g., engineering plastics and thermoplastic elastomers), metal-based and ceramics-based material systems are most commonly used for turbomachine components.

The physical processes associated with laser sintering or laser melting include heat transfer to a powder material and then either sintering or melting the powder material. However, during laser sintering/melting processes, a three-dimensional object, such as one or more of the turbomachine components described above, is subject to numerous thermal stresses due to the heat experienced through the melting and/or sintering of the material. These thermal stresses have been shown to cause various deformations and/or distortions to the turbomachine component. Accordingly, there is a need for an improved turbomachine component and method of additively manufacturing the turbomachine component that advantageously minimizes or eliminates distortions in the turbomachine component caused by thermal stress experienced during the additive manufacturing process.

Moreover, turbomachine components (such as fuel nozzles) experience thermal stresses during use as they receive compressed air at a first temperature and fuel at a second temperature, which may be hundreds of degrees cooler than the first temperature. Accordingly, there is a need for an improved turbomachine component and method of additively manufacturing the turbomachine component that advantageously manages thermal stresses experienced by the turbomachine component while in use.

BRIEF DESCRIPTION

Aspects and advantages of the turbomachine components and methods in accordance with the present disclosure will be set forth in part in the following description, or may be obvious from the description, or may be learned through practice of the technology.

In accordance with one embodiment, a turbomachine component is provided. The turbomachine component formed from an additive manufacturing system. The additive manufacturing system defines an axial build direction, a radial direction, and a circumferential direction. The turbomachine component includes an exterior portion. The exterior portion includes a first end wall, a second end wall, and an outer band extending axially between the first end wall and the second end wall. The turbomachine component further includes an interior portion disposed within the exterior portion. The interior portion includes a self-breaking inner band extending axially between the first end wall and the second end wall. The self-breaking inner band includes a plurality of teeth disposed between the first end wall and the second end wall.

In accordance with another embodiment, a method of fabricating a turbomachine component using an additive manufacturing system is provided. The method includes irradiating a layer of powder in a powder bed to form a fused region. The powder is disposed on a build plate. The method further includes providing a subsequent layer of powder over the powder bed by passing a recoater arm over the powder bed from a first side of the powder bed. The method further includes repeating the irradiating and providing steps until the turbomachine component is formed on the build plate. The turbomachine component includes an exterior portion. The exterior portion includes a first end wall, a second end wall, and an outer band extending axially between the first end wall and the second end wall. The turbomachine component further includes an interior portion disposed within the exterior portion. The interior portion includes a self-breaking inner band extending axially between the first end wall and the second end wall. The self-breaking inner band includes a plurality of teeth disposed between the first end wall and the second end wall.

In accordance with yet another embodiment, a bundled tube fuel nozzle is provided. The bundled tube fuel nozzle includes a first end wall, a second end wall, an outer band that extends between the first end wall and the second end wall, and an inner band that extends between the first end wall and the second end wall. The inner band is disposed within the outer band. A bellows wall is disposed between the inner band and the outer band. The bellows wall surrounds the inner band such that a first fuel plenum is defined annularly between the inner band and the bellows wall. The inner band defines a second fuel plenum that is in fluid communication with the first fuel plenum via one or more apertures defined in the inner band. A plurality of tubes extends in an axial direction between the first end wall and the second end wall within the second fuel plenum.

In accordance with another embodiment, a combustor is provided. The combustor includes a combustion liner that defines a combustion chamber. The combustor further comprises an outer casing that surrounds the combustion liner such that an annulus is defined between the combustion liner and the outer casing. The outer casing defines a head end volume in fluid communication with the annulus. The combustor further includes a bundled tube fuel nozzle that is disposed at least partially within the head volume. The bundled tube fuel nozzle includes a first end wall, a second end wall, an outer band that extends between the first end wall and the second end wall, and an inner band that extends between the first end wall and the second end wall. The inner band is disposed within the outer band. A bellows wall is disposed between the inner band and the outer band. The bellows wall surrounds the inner band such that a first fuel plenum is defined annularly between the inner band and the bellows wall. The inner band defines a second fuel plenum that is in fluid communication with the first fuel plenum via one or more apertures defined in the inner band. A plurality of tubes extends in an axial direction between the first end wall and the second end wall within the second fuel plenum.

These and other features, aspects and advantages of the present turbomachine components and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present turbomachine components and methods, including the best mode of making and using the present systems and methods, directed to one of ordinary skill in the art, is set forth in the specification, which makes reference to the appended figures, in which.

DETAILED DESCRIPTION

Figure 1:
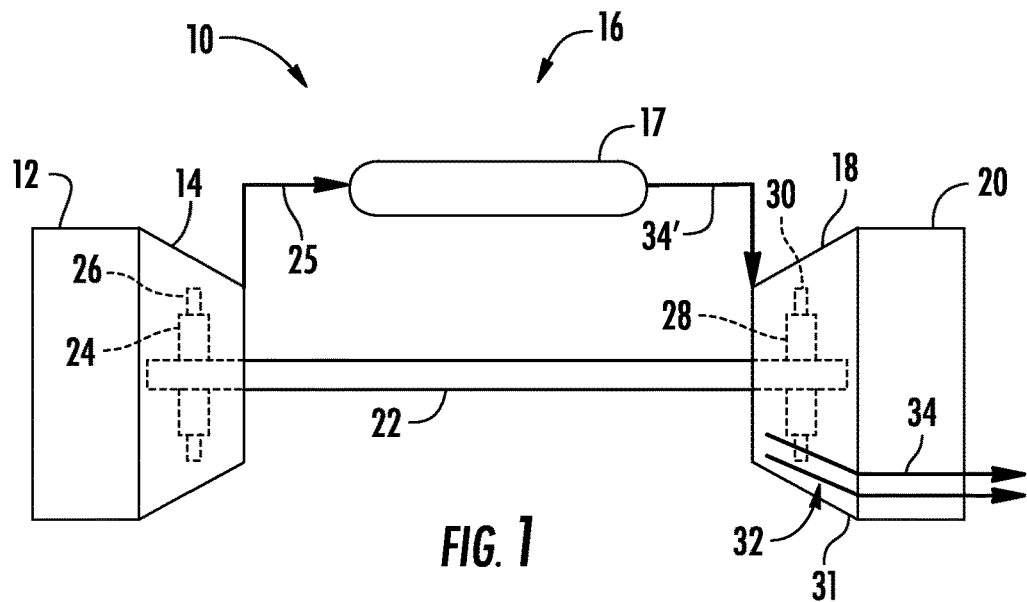
FIG. 1 is a schematic illustration of a turbomachine in accordance with embodiments of the present disclosure.

Reference now will be made in detail to embodiments of the present turbomachine components and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "and/or" refers to an inclusive condition and not to an exclusive condition. For example, a condition A and/or B is satisfied by any one of the following: A is true (or present) and B is false (or not present), A is false for not present) and B is true (or present), and both A and B are true (or present).

Here and throughout the specification and claims, where range limitations may be combined and interchanged, such ranges are identified and include all the sub-ranges contained therein unless context or language indicates otherwise. For example, all ranges disclosed herein are inclusive of the endpoints, and the endpoints are independently combinable with each other.

As described in detail below, exemplary embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

The additive manufacturing processes described herein may be used for forming components using any suitable material. For example, the material may be metal, ceramic, any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials."

As used herein, references to "fusing" may refer to any suitable process for creating a bonded layer of any of the above materials. For example, if the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Each successive layer may be, for example, between about 10 μm (micrometers) and 200 μm (micrometers), although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

Notably, in exemplary embodiments, several features of the components described herein were previously not possible due to manufacturing constraints. However, the present inventors have advantageously utilized current advances in additive manufacturing techniques to develop exemplary embodiments of such components in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to an industrial and/or land-based gas turbine unless otherwise specified in the claims. For example, the turbomachine components as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors 17 (one of which is shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed through stages of rotating blades 26 and stationary nozzles (not shown), thus providing pressurized or compressed air 25 to the combustors 17 of the combustor section 16. The compressed air 25 is mixed with fuel and burned within each combustor 17 to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The spent combustion gases 34 exiting the turbine section 18 may then be exhausted from the gas turbine 10 via the exhaust section 20.

Figure 2:
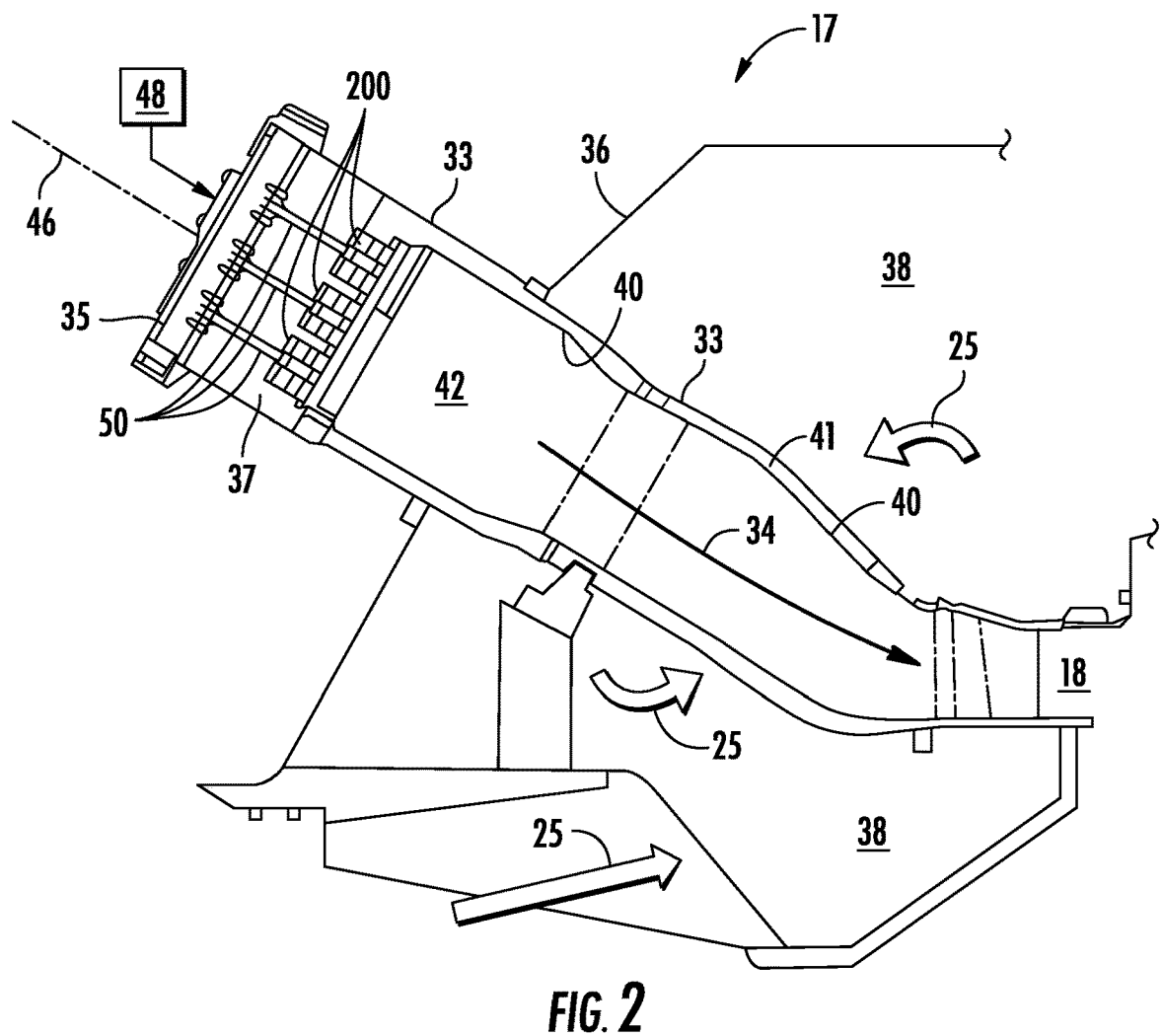
FIG. 2 illustrates a cross-sectional view of a combustor in accordance with embodiments of the present disclosure.

As shown in FIG. 2, the combustor 17 may be at least partially surrounded a compressor discharge casing 36. The compressor discharge casing 36 may at least partially define a high pressure plenum 38 that at least partially surrounds various components of the combustor 17. The high pressure plenum 38 may be in fluid communication with the compressor section 14 (FIG. 1) so as to receive the compressed air 25 therefrom. An end cover 35 may be coupled to an outer casing 33. In particular embodiments, the outer casing 33 and the end cover 35 may at least partially define a head end volume or portion 37 of the combustor 17.

In particular embodiments, a combustion liner 40 may at least partially define a combustion chamber or zone 42 for combusting the fuel-air mixture and/or may at least partially define a hot gas path through the combustor 17 for directing the combustion gases 34 towards an inlet to the turbine section 18. The head end portion 37 may be in fluid communication with the high pressure plenum 38 and/or the compressor section 14 via a cooling flow annulus 41 defined between the combustion liner 40 and the outer casing 33.

In various embodiments, the combustor 17 includes at least one bundled tube fuel nozzle 200. In one embodiment, the bundled tube fuel nozzle 200 forms the head end 37 of the combustor 17. As shown in FIG. 2, the bundled tube fuel nozzle 200 is disposed within the outer casing 33 downstream from and/or axially spaced from the end cover 35 with respect to axial centerline 46 of the combustor 17 and upstream from the combustion chamber 42. In particular embodiments, the bundled tube fuel nozzle 200 is in fluid communication with a gas fuel supply 48 via one or more fluid conduits 50. In particular embodiments, the fluid conduit(s) 50 may be fluidly coupled and/or connected at one end to the end cover 35.

Figure 3:
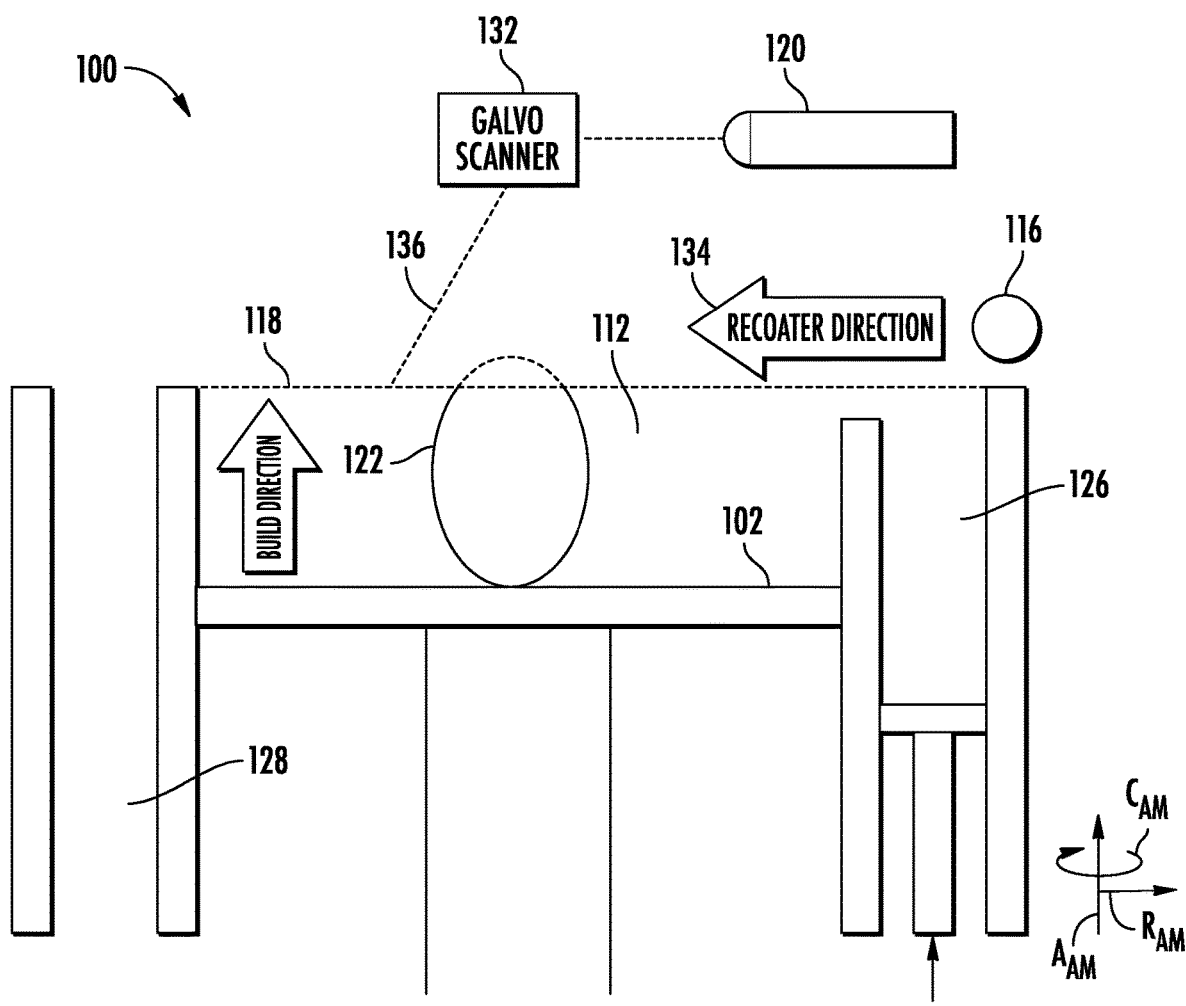
FIG. 3 illustrates a schematic view of an additive manufacturing system in accordance with embodiments of the present disclosure.

To illustrate an example of an additive manufacturing system and process, FIG. 3 shows a schematic/block view of an additive manufacturing system 100 for generating an object 122, which may be the bundled tube fuel nozzle 200. The additive manufacturing system 100 may be configured for direct metal laser sintering (DMLS) or direct metal laser melting (DMLM). For example, the additive manufacturing system 100 may fabricate objects, such as the bundled tube fuel nozzle 200 or other components.

For example, the object 122 may be fabricated in a layer-by-layer manner by sintering or melting a powder material in a powder bed 112 using an energy beam 136 generated by a source such as a laser 120. The powder to be melted by the energy beam is supplied by reservoir 126 and spread evenly over a build plate 102 using a recoater arm 116, which moves in a recoater direction 134, to maintain the powder at a level 118 and to remove excess powder material extending above the powder level 118 to waste container 128. The energy beam 136 sinters or melts a cross sectional layer of the object being built under control of the galvo scanner 132. The build plate 102 is lowered, and another layer of powder is spread over the build plate and the object being built, followed by successive melting/sintering of the powder by the laser 120. The process is repeated until the object 122 is completely built up from the melted/sintered powder material.

The laser 120 may be controlled by a computer system including a processor and a memory. The computer system may determine a scan pattern for each layer and control laser 120 to irradiate the powder material according to the scan pattern. After fabrication of the object 122 is complete, various post-processing procedures may be applied to the object 122. Post processing procedures include removal of excess powder by, for example, blowing or vacuuming. Advantageously for the present bundled tube fuel nozzle 200 (for reasons discussed herein), other post processing procedures include a stress release process. Additionally, thermal and chemical post processing procedures can be used to finish the object 122.

In exemplary embodiments, the additive manufacturing system 100 may define a cylindrical coordinate system having an axial build direction $A_{AM}$ (or build direction), a radial direction $R_{AM}$ perpendicularly to the build direction, and a circumferential direction $C_{AM}$ extending around the build direction.

Figure 4:
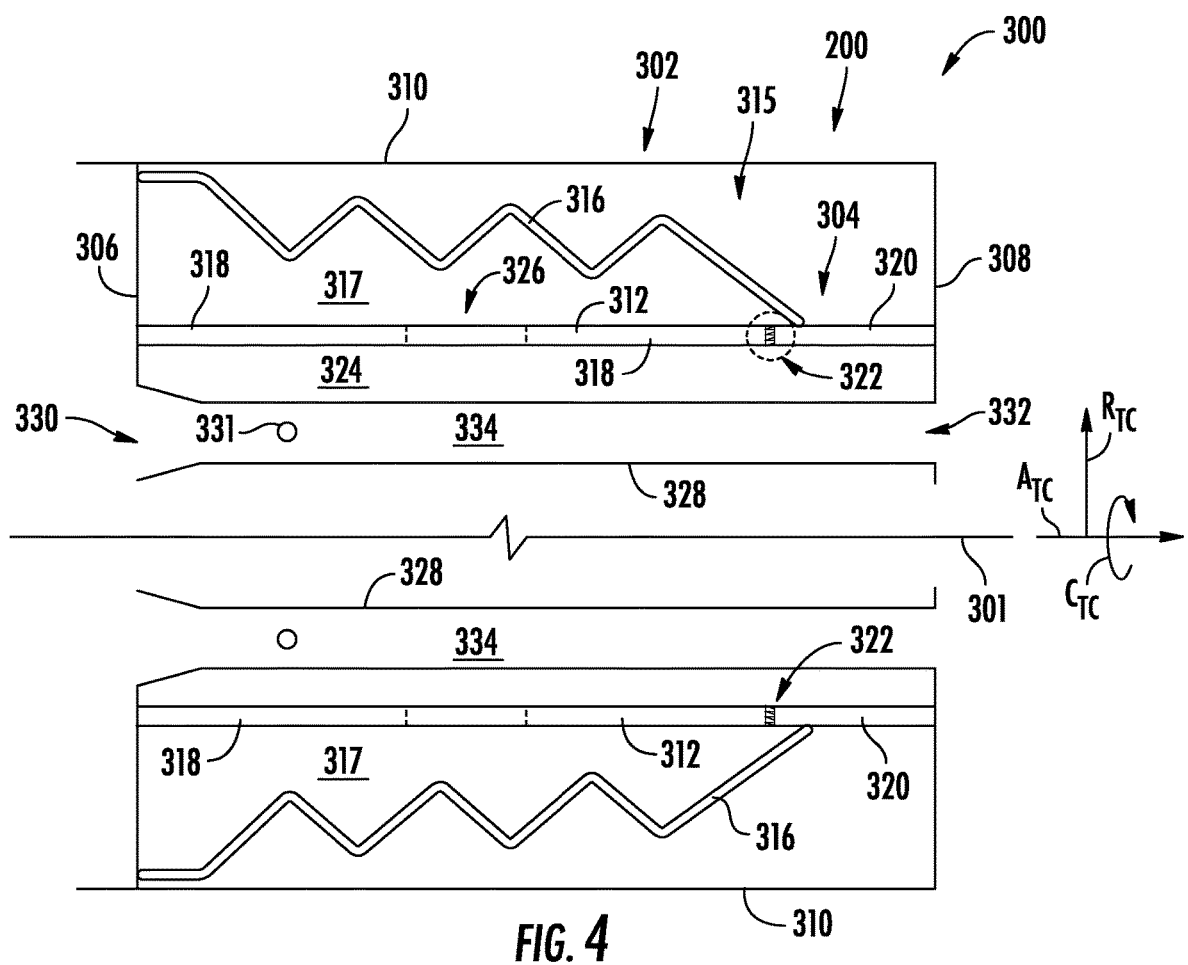
FIG. 4 illustrates a cross-sectional view of a turbomachine component in a connected position in accordance with embodiments of the present disclosure.
Figure 5:
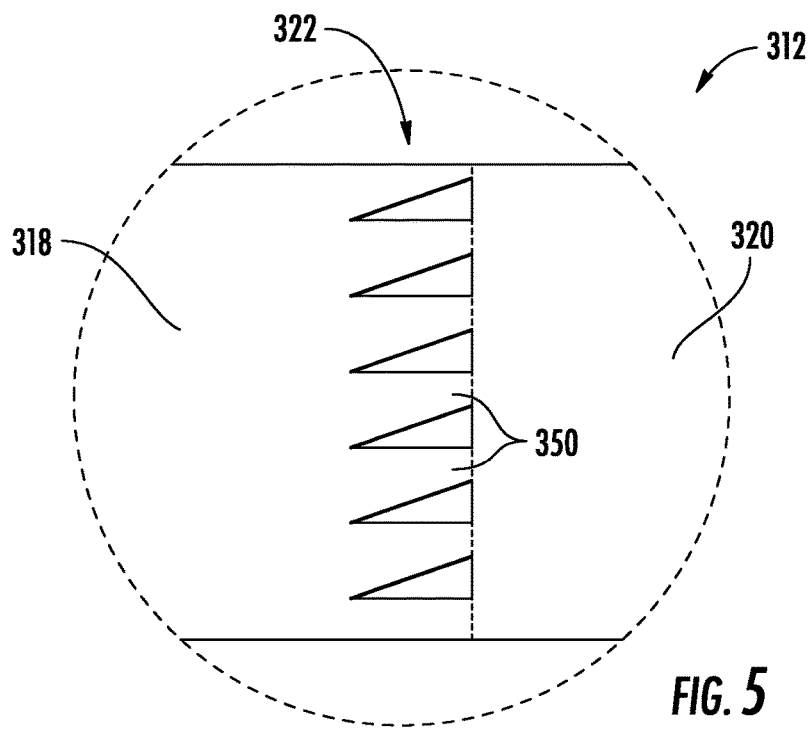
FIG. 5 illustrates an enlarged view of an encircled detail of FIG. 4, in which a self-breaking inner band is in the connected position in accordance with embodiments of the present disclosure.
Figure 6:
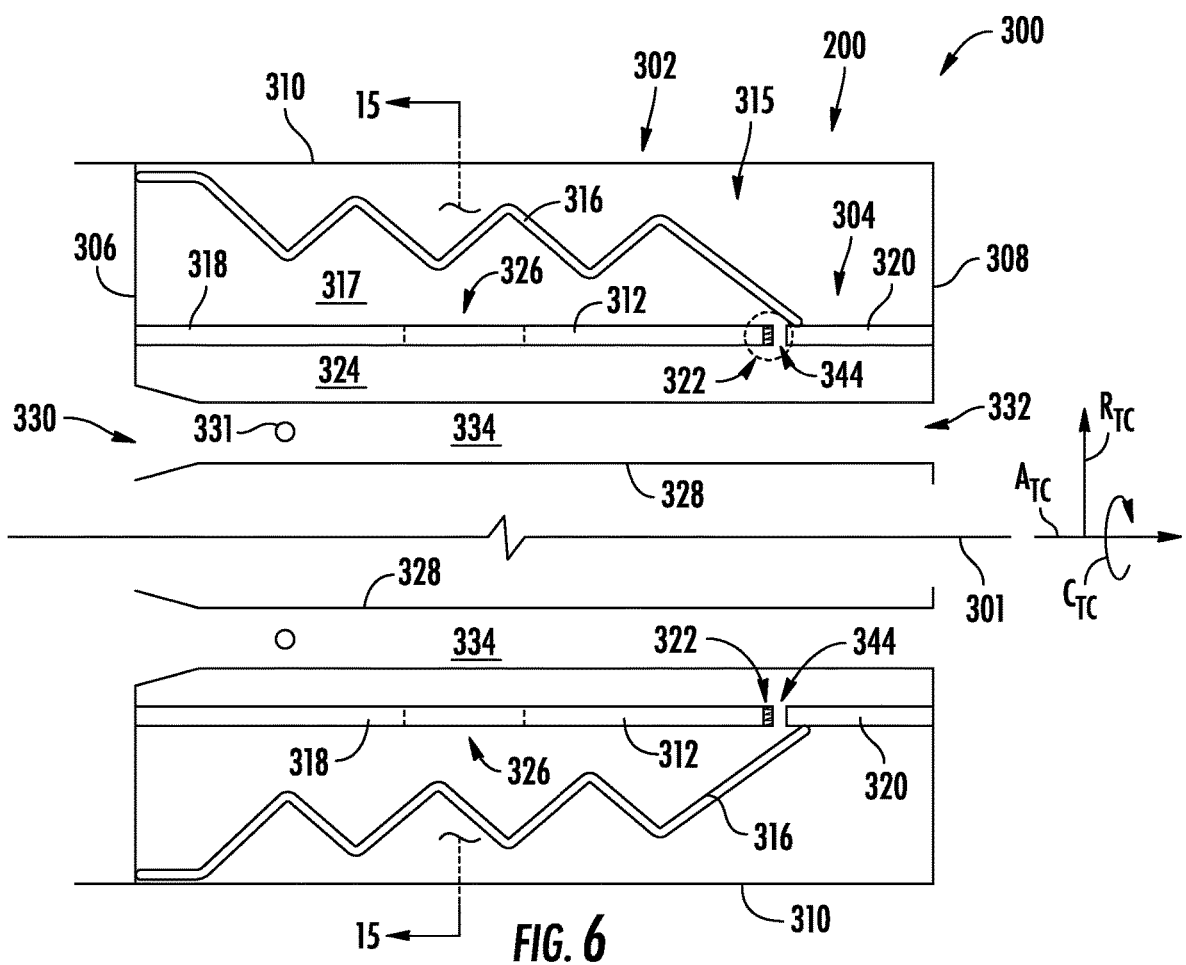
FIG. 6 illustrates a cross-sectional view of a turbomachine component in a disconnected position in accordance with embodiments of the present disclosure.
Figure 7:
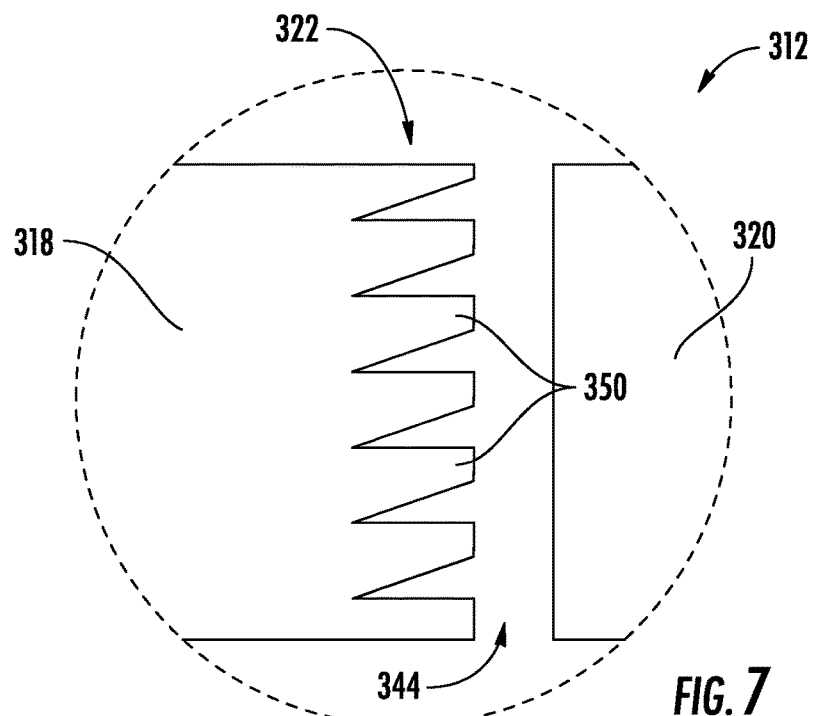
FIG. 7 illustrates an enlarged view of an encircled detail of FIG. 6, in which the self-breaking inner band is in the disconnected position.

Referring now to FIGS. 4 through 7, various views of a turbomachine component 300 are illustrated in accordance with embodiments of the present disclosure. For example, FIG. 4 illustrates a cross-sectional view of a turbomachine component 300 in a connected position; FIG. 5 illustrates an enlarged view of an encircled detail of FIG. 4, in which an inner band or self-breaking inner band 312 in a connected position; FIG. 6 illustrates a cross-sectional view of a turbomachine component 300 in a disconnected position; and FIG. 7 illustrates an enlarged view of an encircled detail of FIG. 6, in which the self-breaking inner band 312 is in a disconnected position. In exemplary embodiments, the turbomachine component 300 may be the bundled tube fuel nozzle 200 described above with reference to FIGS. 2 and 3. However, in other embodiments, the turbomachine component may be any other component of the gas turbine 10, such as one of the turbine/compressor rotor blades, the stator vanes, the turbine nozzles, or other gas turbine components, and the turbomachine component 300 should not be limited to any particular component of the turbomachine unless specifically recited in the claims.

In exemplary embodiments, the turbomachine component 300 may be formed from an additive manufacturing system (such as the additive manufacturing system 100 described above with reference to FIG. 2). The turbomachine component 300 may define a cylindrical coordinate system that entirely coincides with the cylindrical coordinate system of the additive manufacturing system 100. For example, as shown in FIG. 4, the turbomachine component 300 may define an axial direction $A_{TC}$ (which is parallel to the axial build direction $A_{AM}$) that extends along an axial centerline 301 of the turbomachine component 300, a radial direction $R_{TC}$ extending perpendicular to the axial direction $A_{TC}$, and a circumferential direction $C_{TC}$ that extends around the axial direction $A_{TC}$.

The turbomachine component 300 may include an exterior portion 302 and an interior portion 304 within the exterior portion 302 and connected to the exterior portion 302. For example, the interior portion 304 may extend entirely within the exterior portion 302 and may be coupled to the exterior portion 302 in one or more locations. In many embodiments, the exterior portion 302 and the interior portion 304 of the turbomachine component 300 may be concentrically shaped structures, such that the exterior portion 302 and the interior portion 304 define the same shape having different sizes. Additionally, the interior portion 304 and the exterior portion 302 may share a common axial centerline (e.g., the interior portion 304 and the exterior portion 302 may be coaxial). For example, the axial centerline 301 of the turbomachine component 300 may be common to both the interior portion 304 and the exterior portion 302.

In various embodiments, the interior portion 304 and the exterior portion 302 may be annular. For example, the interior portion 304 and the exterior portion 302 may each extend annularly around an axial centerline 301 of the turbomachine component 300. Additionally, the interior portion 304 and the exterior portion 302 may be coaxially aligned with one another and with the axial centerline 301 of the turbomachine component 300. In many embodiments, the exterior portion 302 and the interior portion 304 may be concentric to one another such that the exterior portion 302 and the interior portion 304 share a common center point (and/or axial centerline).

In many embodiments, the exterior portion 302 may include a first end wall or forward wall 306, a second end wall or aft wall 308, and an outer band 310 extending axially between the first end wall 306 and the second end wall 308. The first end wall 306 and the second end wall 308 may be generally parallel to one another and may extend generally radially. The outer band 310 may extend annularly around the axial centerline 301 (e.g., 360° in the circumferential direction) and axially between the first end wall 306 and the second end wall 308.

In exemplary embodiments, the interior portion 304 may be disposed within the exterior portion 302. The interior portion 304 may include a self-breaking inner band 312 extending axially between the first end wall 306 and the second end wall 308. The self-breaking inner band 312 may extend annularly about the axial centerline 301 of the turbomachine component 300. The self-breaking inner band 312 may be radially spaced apart from the outer band 310 such that an annular plenum 315 is defined therebetween.

In exemplary embodiments, the self-breaking inner band 312 may include a first solid portion 318, a second solid portion 320, and a perforated portion 322 disposed between (e.g., axially) the first solid portion 318 and the second solid portion 320. The first solid portion 318 may extend from the first end wall 306 to the perforated portion 322, and the second solid portion 320 may extend from the second end wall 308 to the perforated portion 322. The perforated portion 322 may include one or more through-holes, perforations, voids, or gaps extending through the self-breaking inner band 312 to facilitate the separation of the self-breaking inner band 312 into two separate portions. As used herein, the term "solid," when used in reference to a component or portion of a component, may refer a component that is impermeable, such that the component does not allow air or other fluids to pass therethrough. For example, the first solid portion 318 and the second solid portion 320 of the self-breaking inner band 312 may each be impermeable and contain no through holes or other gaps. In various embodiments, the first solid portion 318 may be axially longer than the second solid portion 320.

In various embodiments, such as in embodiments where the turbomachine component 300 is a bundled tube fuel nozzle 200, a bellows wall 316 may extend between the first end wall 306 and the self-breaking inner band 312. Particularly, the bellows wall 316 may extend between the first end wall 306 and the second solid portion 320 of the self-breaking inner band 312. The bellows wall 316 may be an annular member that is corrugated in the axial direction $A_{TC}$ to allow for axial thermal growth between the interior portion 304 and the exterior portion 302. For example, once the self-breaking inner band 312 breaks or severs, the bellows wall 316 may axially thermally expand/retract during operation of the turbomachine component 300. A first fuel plenum 317 may be defined between the bellows wall 316 and the self-breaking inner band 312.

In some embodiments, the self-breaking inner band 312 may define a second fuel plenum 324 in fluid communication with the first fuel plenum 317 such that the second fuel plenum 324 receives fuel from the first fuel plenum 317. In some embodiments, the first fuel plenum 317 may be in fluid communication with the second fuel plenum 324 via one or more apertures 326 (shown in phantom). In such embodiments, the self-breaking inner band 312 may include three solid portions instead of two, e.g., a first solid portion extending axially from the first end wall 306 to the one or more apertures 326, a second solid portion extending axially from the one or more apertures 326 to the perforated portion 322, and a third solid portion extending from the perforated portion 322 to the second end wall 308.

In many embodiments, the bundled tube fuel nozzle 200 may further include a plurality of tubes 328 each defining a premix passage 334 and extending from an inlet 330 defined in the first end wall 306, through the second fuel plenum 324, to an outlet 332 defined in the second end wall 308. Additionally, a fuel port or hole 331 may be defined on each tube 328 of the plurality of tubes 328 to provide for fluid communication between the second fuel plenum 324 and the premix passage 334. In operation, each premix passage 334 may receive air at the inlet 330 and fuel at the fuel port 331, which mixes together and is exhausted at the outlet 332 for combustion. While FIGS. 4 and 6 illustrate a bundled tube fuel nozzle 200 having two tubes 328 for the purposes of discussion, it should be appreciated that the bundled tube fuel 200 may include any number of tubes 328, and the present invention should not be limited to any particular number of tubes 328 unless specifically recited in the claims. For example, the break line in the middle of FIGS. 4 and 6 is used to indicate that the bundled tube fuel nozzle 200 may include any number of tubes 328.

In exemplary embodiments, the self-breaking inner band 312 may include a plurality of teeth 350 disposed between the first end wall 306 and the second end wall 308. Particularly, the perforated portion 322 may extend circumferentially about axial centerline 301 and may include the plurality of teeth 350 arranged at a common axial plane between the first end wall 306 and the second end wall 308. The plurality of teeth 350 may be sized and shaped to break in response to thermal stresses or other forces. In many implementations, the plurality of teeth 350 may be severable from the second solid portion 320 in response to a breaking force such that the self-breaking inner band 312 is transitionable from a connected state (as shown in FIGS. 4 and 5) to a disconnected state (as shown in FIGS. 6 and 7). In other words, the turbomachine component 300 may be formed by additive manufacturing with the self-breaking inner band 312 in an unbroken position (shown in FIGS. 4 and 5). Subsequently, the turbomachine component may be exposed to a breaking force, a thermal cycle, or an operational cycle, in which the first solid portion 318 of the self-breaking inner band 312 extending from the first end wall 306 is physically separated from the second solid portion 320 extending from the second end wall 308 (as shown in FIGS. 6 and 7). For example, as a result of the breaking force, the thermal cycle, or the operational cycle, the self-breaking inner band 312 may be split from a singular wall that extends continuously from the first end wall 306 to the second end wall 308 to the first solid portion 318 and the second solid portion 320 with a gap 344 disposed therebetween. The gap 344 may be defined between the first solid portion 318 and the second solid portion 320 after the self-breaking inner band 312 is broken at the perforated portion 322.

Figure 8:
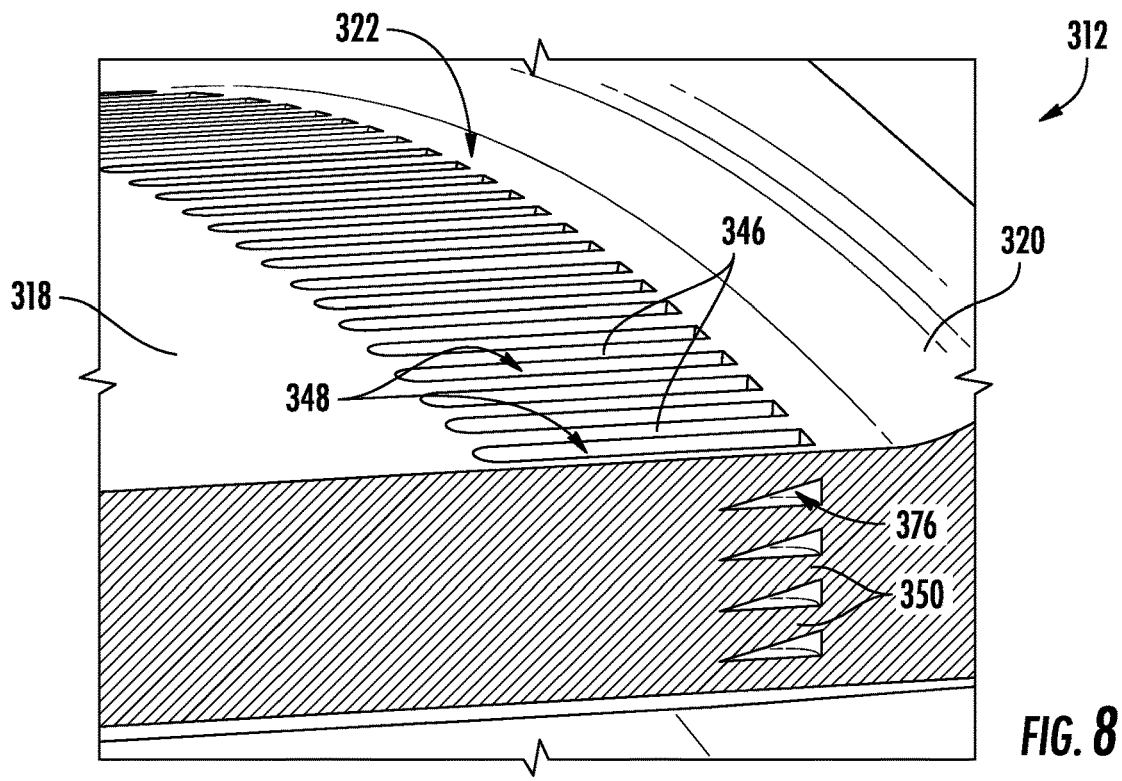
FIG. 8 illustrates an enlarged cross-sectional perspective view of a self-breaking inner band in accordance with embodiments of the present disclosure.
Figure 9:
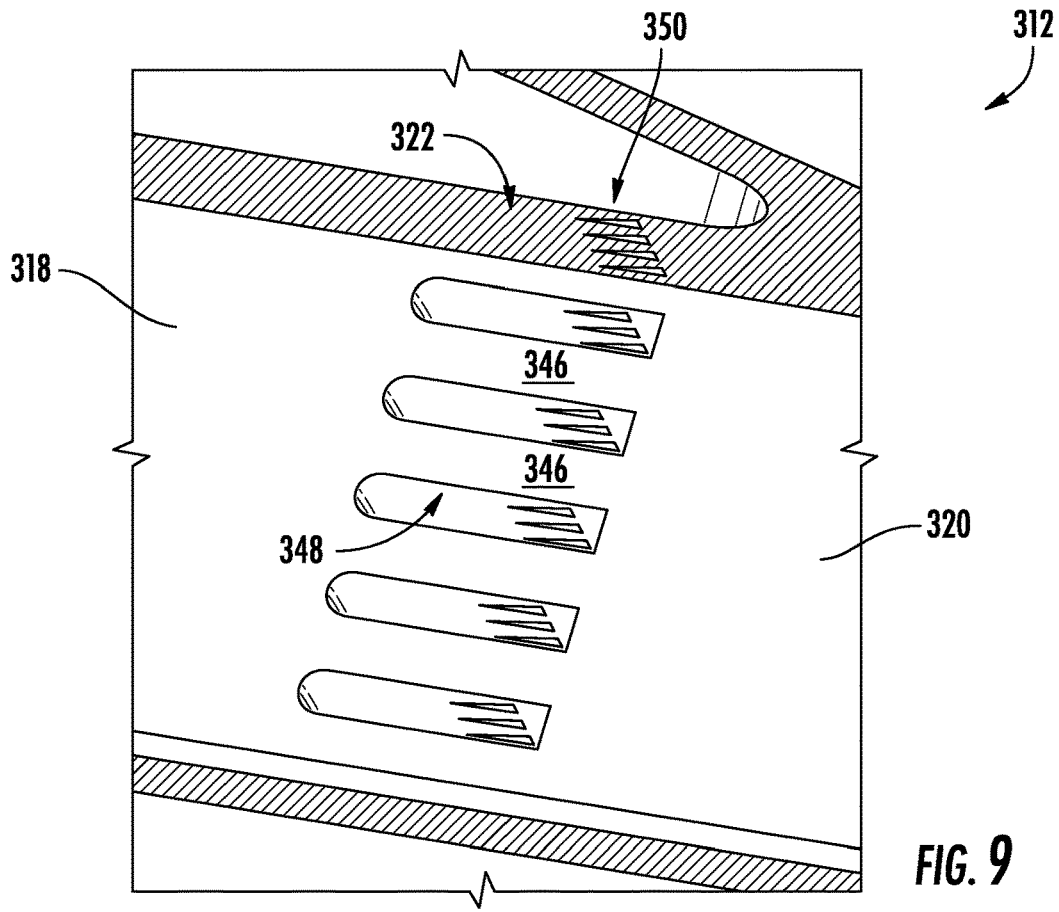
FIG. 9 illustrates an enlarged cross-sectional perspective view of a self-breaking inner band in accordance with embodiments of the present disclosure.

Referring now to FIGS. 8 and 9, two different enlarged perspective views of the self-breaking inner band 312 are illustrated in accordance with embodiments of the present disclosure. For example, FIGS. 8 and 9 each illustrate an enlarged cross-sectional perspective view of the self-breaking inner band 312.

As shown in FIGS. 8 and 9, the perorated portion 322 may include a plurality of walls 346 spaced apart (e.g., circumferentially spaced apart) from one another such that circumferential perforations 348 are defined between each adjacent pair of walls 346 of the plurality of walls 346. Additionally, in exemplary embodiments, a plurality of teeth 350 may extend from each wall 346 of the plurality of walls 346. Each wall 346 of the plurality of walls 346 may extend between the first solid portion 318 and a plurality of teeth 350 disposed at the end of each wall 346 of the plurality of walls 346. The plurality of teeth 350 disposed at the end of each wall 346 may extend between the respective wall 346 and the second solid portion 320.

Figure 10:
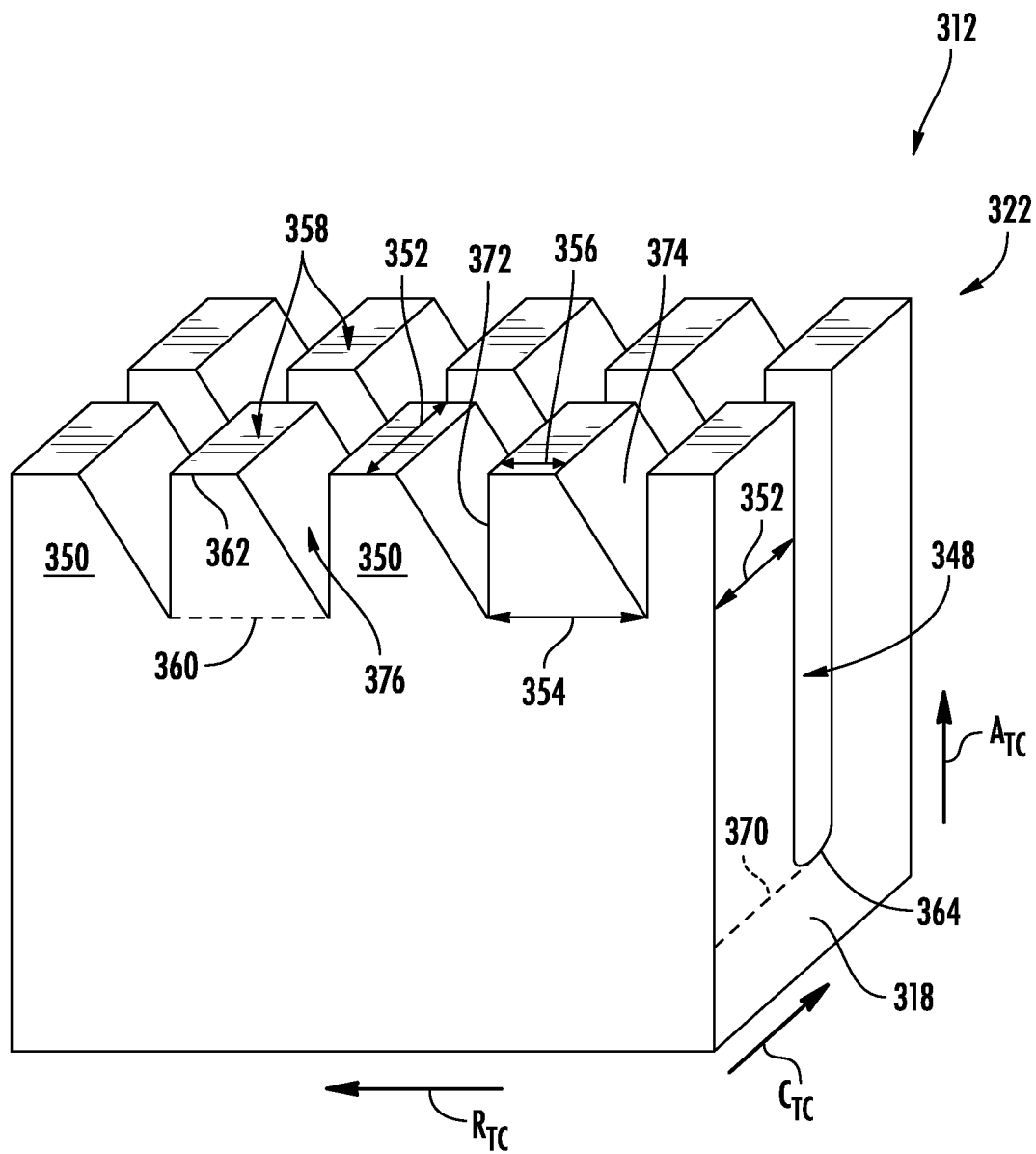
FIG. 10 illustrates an enlarged perspective view of the perforated portion extending from a first solid portion but disconnected from a second solid portion in accordance with embodiments of the present embodiments.

Referring now to FIG. 10, a perspective view of a portion of the self-breaking inner band 312 is illustrated in accordance with embodiments of the present disclosure. Particularly, FIG. 10 illustrates an enlarged perspective view of the perforated portion 322 extending from the first solid portion 318 but disconnected from the second solid portion 320 to show the configuration of the plurality of walls 346 and the plurality of teeth 350. In many embodiments, each tooth 350 may be generally wedge shaped and may extend between a respective wall 346 of the plurality of walls 346 and the second solid portion 320. However, in other embodiments (not shown), each tooth 350 may have other shapes, such as cylindrical, conical, or others.

As shown in FIG. 10, at least one tooth 350 in the plurality of teeth 350 may taper in thickness as the at least one tooth 350 extends axially from a respective wall 346 of the plurality of walls 346. For example, as shown in FIG. 10, each tooth of the plurality of teeth 350 may taper in thickness as each tooth extends from a respective wall 346 of the plurality of walls 346. Particularly, in exemplary embodiments, each wall 346 and each tooth 350 may define a common circumferential thickness 352 that is constant. For example, the common circumferential thickness 352 may be shared (or common) to each respective wall 346 and the respective teeth 350 extending from each respective wall 346. The common circumferential thickness 352 may be constant in the axial direction $A_{TC}$, such that the circumferential thickness of the wall 346 and the plurality of teeth 350 does not change as the wall 346 and the plurality of teeth 350 extend axially.

In various embodiments, as shown in FIG. 10, each tooth 350 may extend from a base 360 coupled to the wall 346 to a tip 362 coupled to the second solid portion 320. Additionally, each tooth 350 may taper from a first radial thickness 354 at the base 360 to a second radial thickness 356 at the tip 362. In other words, as each tooth 350 extends axially from the base 360 to the tip 362, the tooth 350 may continuously taper radially (e.g., linearly taper). Particularly, as shown in FIG. 10, each tooth 350 of the plurality of teeth 350 may define a break off plane 358 at the tip 362. The break off plane 358 may be defined at an intersection between the tip 362 of the tooth 350 and the second solid portion 320 of the self-breaking inner band 312.

In many embodiments, the break off plane 358 may include the common circumferential thickness 352 and the second radial thickness 356. In such embodiments, the common circumferential thickness 352 may be between about 100% and about 500% of the second radial thickness 356 at the break off plane 358, or such as between about 150% and about 450%, or such as between about 200% and about 400%. This is advantageous over, e.g., a tooth (or teeth) having a large first dimension and small second dimension (i.e., thin break off supports) because it prevents debris from falling into the plenum(s) 317 and/or 324 and becoming trapped within the turbomachine component 300. For example, embodiments in which one of the circumferential thickness or the second radial thickness is greater than about 600% of the other would be disadvantageous because it would result in a tooth that is too thin in one direction thereby causing unwanted debris within the turbomachine component 300 when the tooth is broken off.

Figure 11:
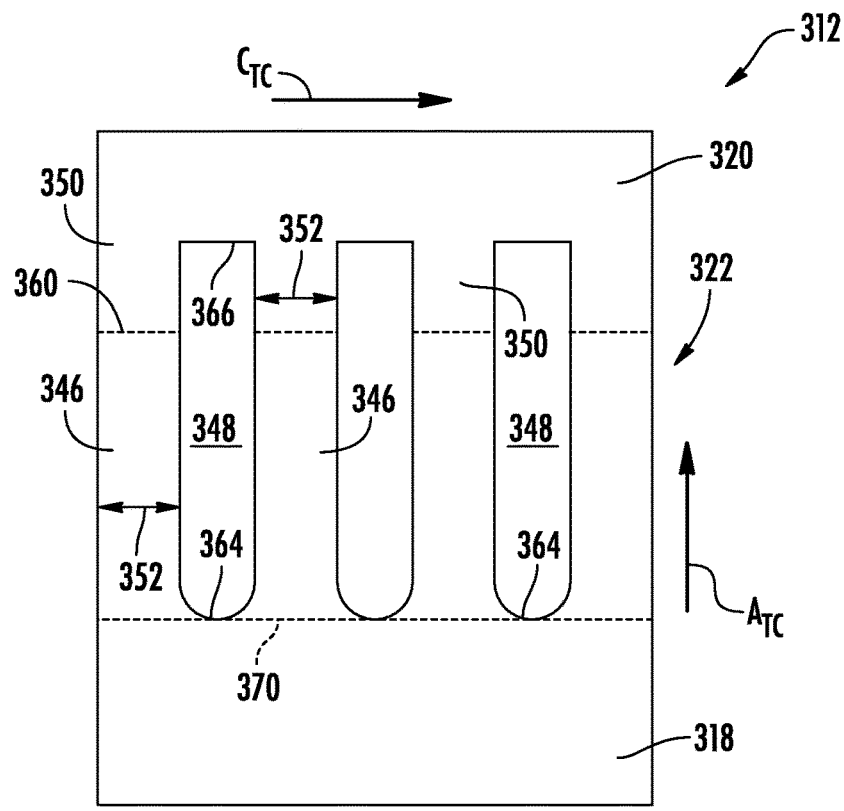
FIG. 11 illustrates an enlarged view of a portion of a self-breaking inner band in an axial-circumferential plane.

Referring now to FIG. 11, an enlarged view of a portion of the self-breaking inner band 312 in an axial-circumferential plane is illustrated in accordance with embodiments of the present disclosure. As shown, each wall 346 may extend axially from a root 370 coupled to the first solid portion 318 to the base 360 (shown in phantom) of the plurality of teeth 350, and each tooth 350 may extend axially between the base 360 coupled to a respective wall 346 and the tip 362 coupled to the second solid portion 320. As shown in FIG. 11, each circumferential perforation 348 may be collectively defined by two neighboring walls 346, the first solid portion 318, and the second solid portion 320. The first solid portion 318 may include a rounded boundary surface 364 (or arcuate boundary surface) that partially defines a forward end of the circumferential perforation 348. The rounded boundary surface may be semi-circular. Additionally, the second solid portion 320 may include a flat boundary surface 366 that partially defines an aft end of the circumferential perforation 348.

Figure 12:
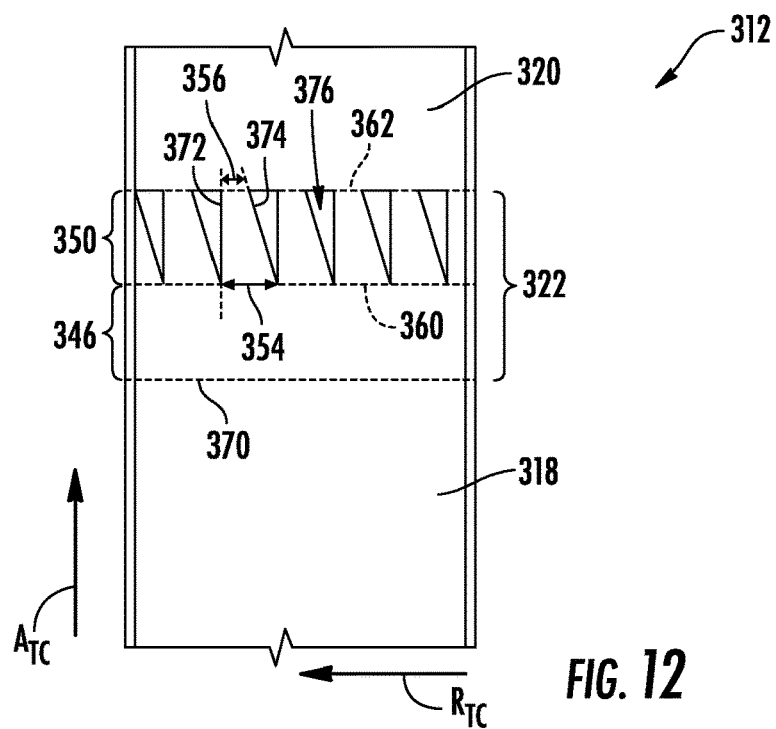
FIG. 12 illustrates an enlarged view of a portion of a self-breaking inner band in an axial-radial plane.

Referring now to FIG. 12, an enlarged view of a portion of the self-breaking inner band 312 in an axial-radial plane is illustrated in accordance with embodiments of the present disclosure. As shown, the wall 346 may extend axially from the root 370 (shown in phantom) coupled to the first solid portion 318 to the base 360 (shown in phantom) of the plurality of teeth 350, and each tooth 350 may extend axially between the base 360 coupled to the wall 346 and the tip 362 (shown in phantom) coupled to the second solid portion 320. As shown in FIG. 12, each tooth 350 may include a straight surface 372 and a slanted surface 374. The straight surface 372 may extend generally parallel to the axial direction $A_{TC}$ of the turbomachine component 300. The slanted surface 374 may continuously converge towards the straight surface 372 as the tooth 350 extends axially between the base 360 and the tip 362.

While FIG. 12 illustrates the slanted surface 374 of each tooth 350 as being defined in the axial-radial plane, it should be appreciated that each tooth 350 may, additionally or alternatively, include a slanted surface in the axial-circumferential plane (or other planes). Additionally, although FIGS. 4-10 and 12 illustrate the plurality of teeth 350 as having a trapezoidal shape in the axial-radial plane, the teeth of the present invention should not be limited to any particular shape unless specifically recited in the claims. Each tooth 350 of the plurality of teeth 350 may converge in cross-sectional area as each tooth 350 extends axially from the base 360 to the tip 362, and, as such, each tooth 350 may define a plurality of cross-sectional shapes not necessarily limited to those shown in FIGS. 4-10 and 12.

However, in exemplary embodiments, the plurality of teeth 350 may each define a trapezoidal cross-sectional shape in the axial-radial plane (or the axial-circumferential plane, or both the axial-radial plane and the axial-circumferential plane). In such embodiments, shown in FIG. 12, each tooth 350 may include the slanted surface 374 and the straight surface 372, which may be advantageous over other designs because it facilitates the additive manufacturing of the self-breaking inner wall without defects and promotes breaking at the teeth 350 location during operation of the component 300.

In exemplary embodiments, as shown in FIG. 12, radial perforations 376 may be defined between each adjacent pair of teeth 350 of the plurality of teeth 350. For example, each radial perforation 376 may be defined collectively by two neighboring teeth 350 of the plurality of teeth 350 and the second solid portion 320. For example, each radial perforation 376 may be defined collectively by the straight surface 372 of a first tooth of the plurality of teeth 350, the slanted surface of a second tooth of the plurality of teeth 350 that neighbors (e.g., directly neighbors) the first tooth, and the second solid portion 320. The radial perforation 376 may be generally shaped as a triangle (e.g., a right triangle). In this way, the radial perforation 376 may define a radial thickness that increases in the axial direction $A_{TC}$.

In many embodiments, both the outer band 310 and the self-breaking inner band 312 are each a thin-walled cylindrical body. For example, as described above, the outer band 310 and the self-breaking inner band 312 may be annular components, such that both the outer band 310 and the self-breaking inner band 312 define a thin-walled cylindrical body that are concentric with one another. In some embodiments, each thin-walled cylindrical body may have a wall thickness that is less than about 15% (or less than about 10%, or less than about 5%) of a diameter of the thin-walled cylindrical body.

Figure 13:
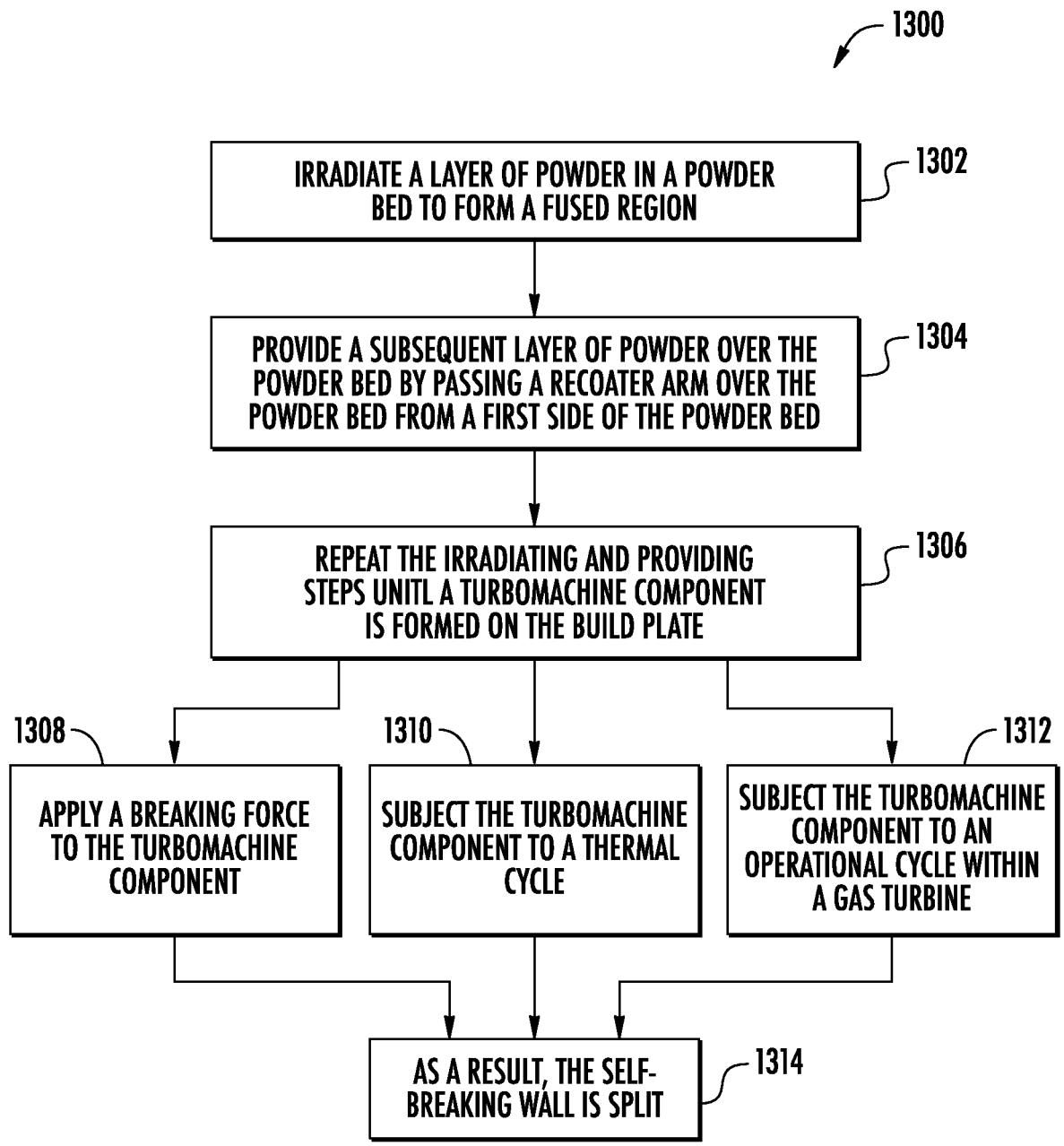
FIG. 13 illustrates a flow diagram of one embodiment of a method of fabricating a turbomachine component using an additive manufacturing system in accordance with embodiments of the present disclosure.

Referring now to FIG. 13, a flow diagram of one embodiment of a method 1300 of fabricating a turbomachine component 300 using an additive manufacturing system 100 is illustrated in accordance with aspects of the present disclosure. In general, the method 1300 will be described herein with reference to the gas turbine 10, the turbomachine component 300, and the additive manufacturing system 100 described above with reference to FIGS. 1 through 12. However, it will be appreciated by those of ordinary skill in the art that the disclosed method 1300 may generally be utilized with any suitable gas turbine and/or may be utilized in connection with any additive manufacturing system having any other suitable system configuration. In addition, although FIG. 13 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

In many implementations, the method 1300 may include (at step 1302) irradiating a layer of powder in a powder bed 112 to form a fused region. In many embodiments, as shown in FIG. 3, the powder bed 112 may be disposed on the build plate 102, such that the fused region is fixedly attached to the build plate 102. The method 1300 may further include (at step 1304) providing a subsequent layer of powder over the powder bed 112 (e.g., from a first side of the powder bed 112) by passing a recoater arm 116 over the powder bed 112. The recoater arm 116 may distribute each layer of powder over the powder bed 112 by passing over the powder bed 112 from a first side to a second side while laying (e.g., dispensing) powder over the powder bed 112. The method 1300 further includes (at step 1306) repeating steps 1302 and 1304 until the turbomachine component 300 is formed in the powder bed 112. The additively manufactured turbomachine component 300 is then removed from the build plate 102.

In optional embodiments, the method 1300 may further include subjecting the turbomachine component 300 to one or more stress release processes (three examples of which are illustrated). In one embodiment, the method 1300 includes (at step 1308) applying a breaking force to the turbomachine component 300. The breaking force may be applied mechanically (or manually) to the exterior portion 302 of the turbomachine component 300. As a result, as shown in the method 1300 (at step 1314), the self-breaking inner band 312 may split into a first portion extending from the first end wall and a second portion extending from the second end wall. A gap 344 may be defined between the first portion and the second portion once the self-breaking inner band 312 splits (as shown in FIGS. 6 and 7).

Additionally, or alternatively, the method 1300 may further include (at step 1310) subjecting the turbomachine component 300 to a thermal cycle, in which a first temperature of the one of the exterior portion 302 or the interior portion 304 is raised relative to a second temperature of the other of the exterior portion 302 or the interior portion 304. Raising the first temperature of one of the exterior portion 302 or the interior portion 304 relative to the second temperature of the other of the exterior portion 302 or the interior portion 304 may advantageously create thermal stresses in the perforated portion 322 that causes the plurality of teeth 350 to break apart from the second solid portion 320 of the self-breaking inner band 312. As a result, as shown in the method 1300 (at step 1314), the self-breaking inner band 312 may split into a first portion extending from the first end wall and a second portion extending from the second end wall. A gap 344 may be defined between the first portion and the second portion once the self-breaking inner band 312 splits (as shown in FIGS. 6 and 7).

In some embodiments, the method 1300 may further include (at step 1312) subjecting the turbomachine component 300 to an operational cycle within a gas turbine 10. For example, the turbomachine component 300 may be a bundled tube fuel nozzle 200, and the operational cycle may include operating the gas turbine 10 by rotating the compressor section to generate compressed air, firing the bundled tube fuel nozzle 200 to generate combustion gases in the combustion section, and rotating the turbine section by expanding the combustion gases therethrough. As a result, as shown in the method 1300 (at step 1314), the self-breaking inner band 312 may split into a first portion extending from the first end wall and a second portion extending from the second end wall. A gap 344 may be defined between the first portion and the second portion once the self-breaking inner band 312 splits (as shown in FIGS. 6 and 7).

The self-breaking inner band 312 may advantageously facilitate the additive manufacturing of the turbomachine component 300 without distortions or manufacturing failures because the self-breaking inner band 312 is in a connected state during and immediately after the fabrication of the turbomachine component 300. Subsequently, after being subject to a breaking force, a thermal cycle, or an operational cycle, the self-breaking inner band 312 may be split into two separate, non-connected portions, which allows the turbomachine component 300 to thermally expand during operation without cracking or breaking. For example, once the self-breaking inner band 312 has been severed or otherwise separated, the interior portion 304 may thermally expand relative to the exterior portion 302 without causing excess thermal stresses in the turbomachine component 300. This thermal expansion may be further aided by the bellows wall 316, which is corrugated to expand/contract in response to the thermal expansion of the turbomachine component. Additionally, the interior portion 304 may be entirely contained within the exterior portion 302 of the turbomachine component 300, such that it cannot be accessed from the outside. As such, the self-breaking inner band 312 may be broken without being directly contacted, such as in response to a breaking force applied externally to the turbomachine component 300 or in response to a thermal/operational cycle of the turbomachine component 300.

Figure 14:
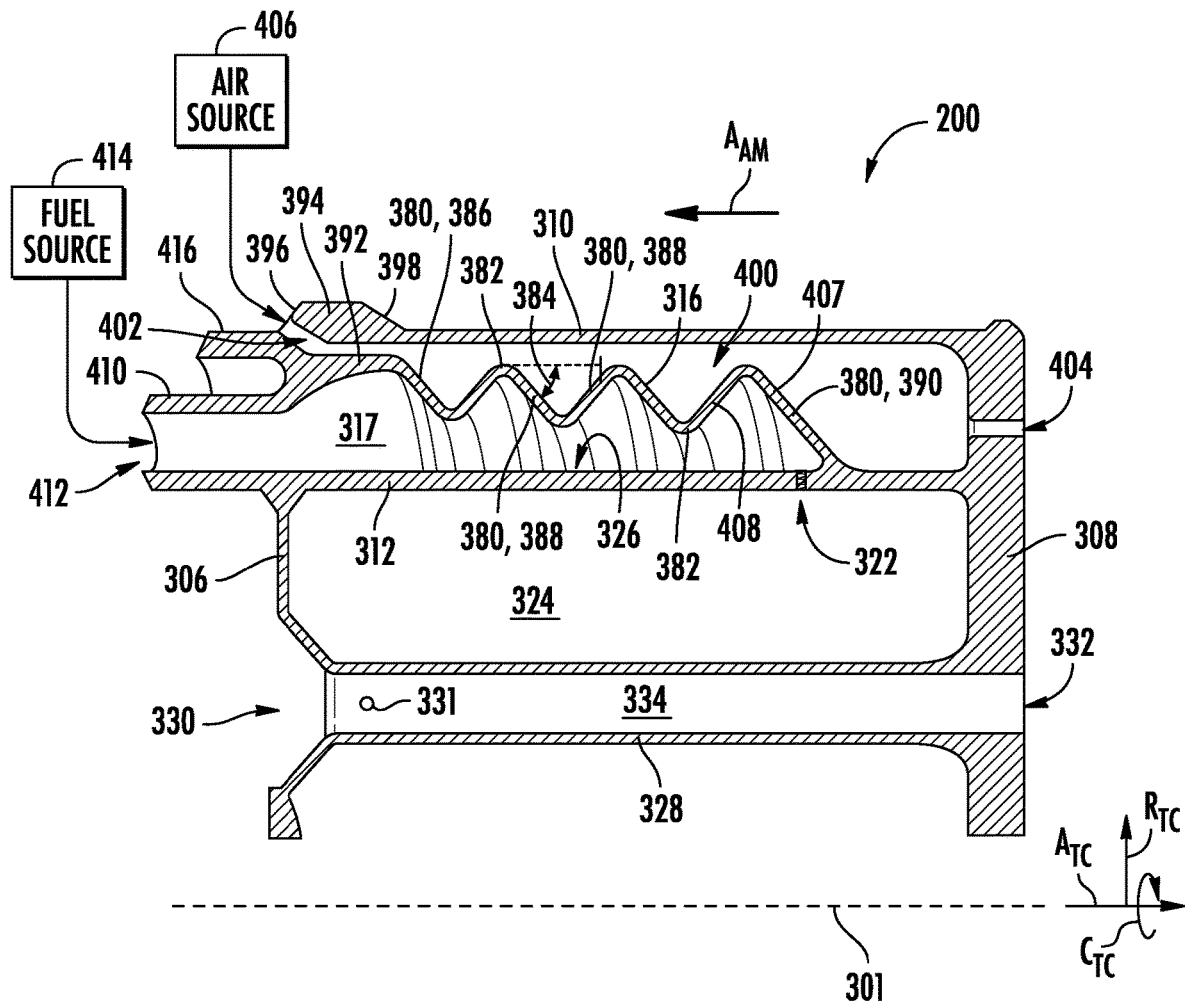
FIG. 14 illustrates a cross-sectional view of a portion of a bundled tube fuel nozzle in accordance with embodiments of the present disclosure.
Figure 15:
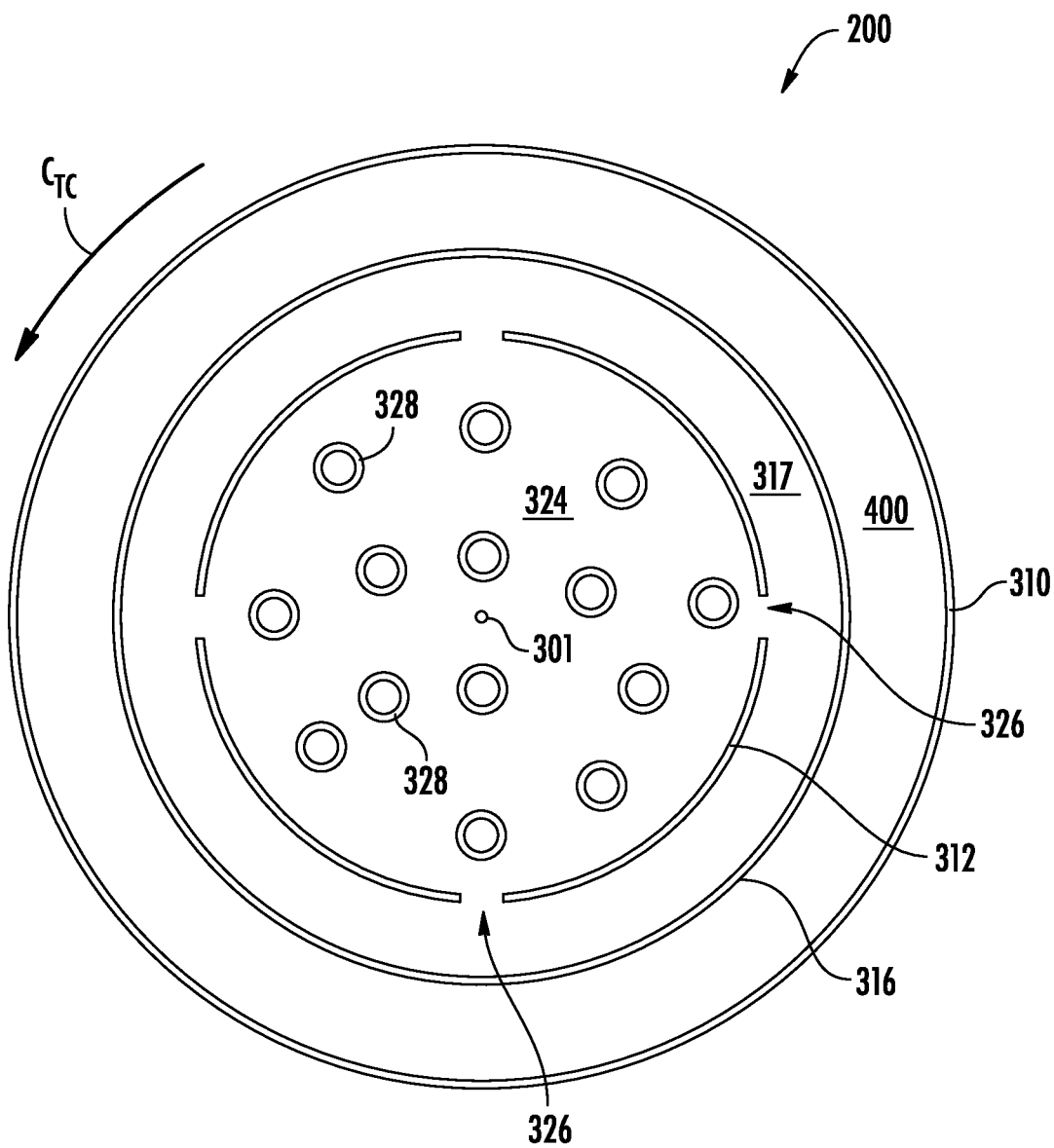
FIG. 15 illustrates a cross-sectional view of a bundled tube fuel nozzle from along the line 15-15 shown in FIG. 6 in accordance with embodiments of the present disclosure.

Referring now to FIGS. 14 and 15, two different cross-sectional views of the bundled tube fuel nozzle 200 are illustrated in accordance with embodiments of the present disclosure. For example, FIG. 14 illustrates a cross-sectional enlarged view of a portion of the bundled tube fuel nozzle 200, and FIG. 15 illustrates a cross-sectional view of the bundled tube fuel nozzle 200 from along the line 15-15 shown in FIG. 6. As shown, the bundled tube fuel nozzle 200 includes the first end wall 306 and the second end wall 308. The outer band 310 may extend between the first end wall 306 and the second end wall 308, and the inner band 312 may also extend between the first end wall 306 and the second end wall 308. Both the outer band 310 and the inner band 312 may extend annularly about the axial centerline 301 of the bundled tube fuel nozzle 200. The inner band 312 may be disposed within the outer band 310.

In exemplary embodiments, the bundled tube fuel nozzle 200 may further include the bellows wall 316 disposed between the inner band 312 and the outer band 310. The bellows wall may surround the inner band 312 such that the first fuel plenum 317 is defined annularly between the inner band 312 and the bellows wall 316. Additionally, the inner band 310 may define the second fuel plenum 324 that is in fluid communication with the first fuel plenum 317 via one or more apertures 326 defined in the inner band 312.

The bellows wall 316 may be corrugated to thermally expand and retract during operation of the bundled tube fuel nozzle 200. The bellows wall 316 may provide increased structural and thermal integrity to the bundled tube fuel nozzle 200, thereby increasing the hardware life and decreasing the likelihood of a failure due to thermal stresses.

In many embodiments, the bellows wall 316 may extend between the first end wall 306 and the inner band 312. In other embodiments (not shown), the bellows wall 316 may extend between the outer band 310 and the inner band 312. As described in detail above, the inner band 312 may include the perforated portion 322. In such embodiments, the bellows wall 316 may extend from the first end wall 306 to the inner band 312 downstream of the perforated portion 322 (with respect to the flow of air/fuel through the tubes 328). Alternatively stated, the bellows wall 316 may extend from the first end wall 306 to the inner band 312 axially aft (downstream) of the perforated portion 322 with respect to the axial direction $A_{TC}$.

As shown in FIG. 14, the bellows wall 316 may include a plurality of oblique portions 380 and a plurality of arcuate apexes 382 each disposed between two oblique portions 380 of the plurality of oblique portions 380. The arcuate apexes 382 may form the intersection or junction between two oblique portions 380 of the plurality of oblique portions 380. The arcuate apexes 382 may be generally rounded, contoured, curved, or radiused (e.g., not including any sharp or sudden changes in direction), which advantageously facilitates the additive manufacturing of the bundled tube fuel nozzle 200. For example, in exemplary implementations, the bundled tube fuel nozzle 200 may be additively manufactured using the additive manufacturing system 100 described above with reference to FIG. 3. In such implementations, the build direction $A_{AM}$ may be opposite the axial direction $A_{TC}$ of the bundled tube fuel nozzle 200. Alternatively, in other embodiments (not shown), the build direction $A_{AM}$ may be the same direction as the axial direction $A_{TC}$ of the bundled tube fuel nozzle 200.

In various embodiments, the oblique portions may be oblique (i.e., neither parallel nor at a right angle) to both the radial direction $R_{TC}$ and the axial direction $A_{TC}$. For example, an angle 384 may be defined between each oblique portion 380 of the plurality of oblique portions 380 and the axial direction $A_{TC}$ (and/or the axial build direction $A_{AM}$), and the angle 384 may be greater than about 40°. Particularly, the angle 384 may be between about 40° and about 65°, or such as between about 40° and about 60°, or such as between about 40° and about 55°, or such as about 45°). The angle 384 may advantageously ensure that the bellows wall 316 may be additively manufactured without excessive overhang, which could otherwise cause defects. Additionally, the angle 384 advantageously provides for increased thermal compliance during operation of the bundled tube fuel nozzle 200.

The plurality of oblique portions 380 may include an initial oblique portion 386, a plurality of intermediate oblique portions 388, and a final oblique portion 390. Additionally, the bellows wall 316 may include a straight portion 392 extending to from the first end wall 306 to the initial oblique portion 386 of the plurality of oblique portions 380. In other words, the initial oblique 386 portion may extend from the straight portion 392 to an arcuate apex 382. Each of the intermediate oblique portions 388 may extend between two arcuate apexes 384. The final oblique portion 390 of the plurality of oblique portions may extend from an arcuate apex 382 to the inner band 312. The final oblique portion 390 may be the longest of the plurality of oblique portions 380 (e.g., between about 10% and about 50% longer than the intermediate oblique portions 388 and/or the initial oblique portion 386).

In exemplary embodiments, as shown in FIG. 14, the bundled tube fuel nozzle 200 may include a delimiter 394 that extends radially outward from the outer band 310. The delimiter 394 may form a portion of the outer band 310 and may extend annularly around the axial centerline 301 of the bundled tube fuel nozzle 200. The delimiter 394 may be the radially outermost portion of the bundled tube fuel nozzle 200, and the delimiter 394 may define a forward face 396 and an aft face 398.

In many embodiments, the bundled tube fuel nozzle 200 may include an annular air plenum 400 that is defined between the outer band 310 and the bellows wall 316. Particularly, the annular air plenum 400 may be defined collectively by the outer band 310, the bellows wall 316, the second end plate 308, and a portion of the inner band 312. An inlet 402 to the annular air plenum 400 may be defined through the delimiter 394. The inlet 402 may be oblique to both the radial direction $R_{TC}$ and the axial direction $A_{TC}$. The inlet 402 may extend through the forward face 396 of the delimiter 394. Additionally, an outlet 404 to the annular air plenum 400 may be defined through the second end wall 308. The inlet 402 may be fluidly coupled to an air source 406 (which may be the head end volume 37 or another air source). The outlet 404 may provide film cooling air to the second end plate 308 during operation of the bundled tube fuel nozzle 200. One or more inlets 402 and one or more outlets 404 may be used.

In certain embodiments, a conduit 410 extends from the first end plate 306 and defines a fuel inlet 412. The fuel inlet 412 may be fluidly coupled to a fuel source 414 (such as a hydrogen fuel source, natural gas fuel source, or other fuel source) and the first fuel plenum 317. The conduit 410 may be generally shaped as a hollow cylinder and may extend axially inward from the first end plate 306. Additionally, as shown in FIG. 14, a supporting annular wall 416 may extend axially inward of the first end wall 306.

As shown in FIG. 14, a radially outer surface 407 of the bellows wall 316 may partially define the air plenum 400, and a radially inner surface 408 of the bellows wall 316 may partially define the first fuel plenum 317. In this way, the bellows wall 316 may be exposed to drastically different fluid temperatures on either side of the bellows wall 316, in response to which the bellows wall 316 will advantageously expand and/or contract, thereby minimizing thermal stresses experienced by the bundled tube fuel nozzle 200. In operation, the air plenum 400 may receive air at an air temperature that is much greater (such as about 700° greater) than a fuel temperature of fuel received by the first fuel plenum 317, and the bellows wall 316 may be robust to this temperature difference such that the bellows wall 316 will thermally comply without experiencing component failures due to thermal stress.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses (this section to be completed by agent once the claims are finalized):

A component formed from an additive manufacturing system, the additive manufacturing system having an axial build direction, a radial direction, and a circumferential direction, the turbomachine component comprising: an exterior portion, the exterior portion including a first end wall, a second end wall, and an outer band extending axially between the first end wall and the second end wall; and an interior portion disposed within the exterior portion, the interior portion including a self-breaking inner band extending axially between the first end wall and the second end wall, the self-breaking inner band including a plurality of teeth disposed between the first end wall and the second end wall.

The component as in one or more of these clauses, wherein the interior portion and the exterior portion are annular.

The component as in one or more of these clauses, wherein the self-breaking inner band includes a perforated portion.

The component as in one or more of these clauses, wherein the self-breaking inner band further includes a first solid portion extending from the first end wall to the perforated portion and a second solid portion extending from the second end wall to the perforated portion.

The component as in one or more of these clauses, wherein the perforated portion includes a plurality of walls spaced apart from one another such that circumferential perforations are defined between each adjacent pair of walls of the plurality of walls.

The component as in one or more of these clauses, wherein the perforated portion further includes a plurality of teeth extending from each wall of the plurality of walls.

The component as in one or more of these clauses, wherein at least one tooth in the plurality of teeth tapers in thickness as the at least one tooth extends axially from a respective wall of the plurality of walls.

The component as in one or more of these clauses, wherein each wall and each tooth define a common circumferential thickness that is constant, and wherein each tooth tapers from a first radial thickness at the wall to a second radial thickness.

The component as in one or more of these clauses, wherein each tooth of the plurality of teeth defines a break off plane, the break off plane having the common circumferential thickness and the second radial thickness, and wherein the common circumferential thickness is between about 100% and about 500% of the second radial thickness at the break off plane.

The component as in one or more of these clauses, wherein radial perforations are defined between each tooth of the plurality of teeth.

The component as in one or more of these clauses, wherein the component is a turbomachine component.

The component as in one or more of these clauses, wherein the turbomachine component is a bundled tube fuel nozzle, wherein the bundled tube fuel nozzle comprises a plurality of tubes and a bellows wall, wherein the plurality of tubes is disposed within the interior portion and extends between the first end wall and the second end wall, and wherein the bellows wall extends between the first end wall and the self-breaking inner band.

The component as in one or more of these clauses, wherein the plurality of teeth are severable in response to a breaking force such that the self-breaking inner band is transitionable from a connected state to a disconnected state.

The component as in one or more of these clauses, wherein the outer band and the self-breaking inner band are each a thin-walled cylindrical body.

The component as in one or more of these clauses, wherein each thin-walled cylindrical body has a wall thickness that is less than 15% of a diameter of the thin-walled cylindrical body.

A method of fabricating a turbomachine component using an additive manufacturing system, the method comprising: irradiating a layer of powder in a powder bed to form a fused region, wherein the powder is disposed on a build plate; providing a subsequent layer of powder over the powder bed by passing a recoater arm over the powder bed from a first side of the powder bed; and repeating the irradiating and providing steps until the turbomachine component is formed on the build plate, the turbomachine component comprising: an exterior portion, the exterior portion including a first end wall, a second end wall, and an outer band extending axially between the first end wall and the second end wall; and an interior portion disposed within the exterior portion, the interior portion including a self-breaking inner band extending axially between the first end wall and the second end wall, the self-breaking inner band including a plurality of teeth disposed between the first end wall and the second end wall.

The method as in one or more of these clauses, further comprising applying a breaking force to the turbomachine component, whereby the self-breaking inner band is split into a first portion extending from the first end wall and a second portion extending from the second end wall, and wherein a gap is defined between the first portion and the second portion.

The method as in one or more of these clauses, further comprising subjecting the turbomachine component to a thermal cycle in which a temperature of the one of the exterior portion or the interior portion is raised relative to the other of the exterior portion or the interior portion, whereby the self-breaking inner band is split into a first portion extending from the first end wall and a second portion extending from the second end wall, and wherein a gap is defined between the first portion and the second portion.

The method as in one or more of these clauses, further comprising subjecting the turbomachine component to an operational cycle within a gas turbine, whereby the self-breaking inner band is split into a first portion extending from the first end wall and a second portion extending from the second end wall, and wherein a gap is defined between the first portion and the second portion.

A bundled tube fuel nozzle comprising: a first end wall; a second end wall; an outer band extending between the first end wall and the second end wall; an inner band extending between the first end wall and the second end wall, the inner band disposed within the outer band; a bellows wall disposed between the inner band and the outer band, the bellows wall surrounding the inner band such that a first fuel plenum is defined annularly between the inner band and the bellows wall, and wherein the inner band defines a second fuel plenum that is in fluid communication with the first fuel plenum via one or more apertures defined in the inner band; and a plurality of tubes extending in an axial direction between the first end wall and the second end wall within the second fuel plenum.

The bundled tube fuel nozzle as in one or more of these clauses, wherein the bellows wall extends between the first end wall and the inner band.

The bundled tube fuel nozzle as in one or more of these clauses, wherein the inner band includes a perforated portion.

The bundled tube fuel nozzle as in one or more of these clauses, wherein the bellows wall extends from a first end connected to the first end wall to a second end connected to the inner band downstream of the perforated portion.

The bundled tube fuel nozzle as in one or more of these clauses, wherein the bellows wall includes a plurality of oblique portions and a plurality of arcuate apexes each disposed between two oblique portions.

The bundled tube fuel nozzle as in one or more of these clauses, wherein an angle is defined between each oblique portion of the plurality of oblique portions and the axial direction, and wherein the angle is greater than about 40°.

The bundled tube fuel nozzle as in one or more of these clauses, wherein an annular air plenum is defined between the outer band and the bellows wall.

The bundled tube fuel nozzle as in one or more of these clauses, wherein a delimiter extends radially outward from the outer band.

The bundled tube fuel nozzle as in one or more of these clauses, wherein an inlet to the annular air plenum is defined through the delimiter, and wherein an outlet to the annular air plenum is defined through the second end wall.

The bundled tube fuel nozzle as in one or more of these clauses, wherein a conduit extends from the first end plate and defines a fuel inlet, the fuel inlet fluidly coupled to a fuel source and the first fuel plenum.

A combustor comprising: a combustion liner defining a combustion chamber; an outer casing surrounding the combustion liner such that an annulus is defined between the combustion liner and the outer casing, the outer casing defining a head end volume in fluid communication with the annulus; and a bundled tube fuel nozzle disposed at least partially within the head volume, the bundle tube fuel nozzle comprising: a first end wall; a second end wall; an outer band extending between the first end wall and the second end wall; an inner band extending between the first end wall and the second end wall, the inner band disposed within the outer band; a bellows wall disposed between the inner band and the outer band, the bellows wall surrounding the inner band such that a first fuel plenum is defined annularly between the inner band and the bellows wall, and wherein the inner band defines a second fuel plenum that is in fluid communication with the first fuel plenum via one or more apertures defined in the inner band; and a plurality of tubes extending in an axial direction between the first end wall and the second end wall within the second fuel plenum.

The combustor as in one or more of these clauses, wherein the bellows wall extends between the first end wall and the inner band.

The combustor as in one or more of these clauses, wherein the inner band includes a perforated portion.

The combustor as in one or more of these clauses, wherein the bellows wall extends from a first end connected to the first end wall to a second end connected to the inner band downstream of the perforated portion.

The combustor as in one or more of these clauses, wherein the bellows wall includes a plurality of oblique portions and a plurality of arcuate apexes each disposed between two oblique portions.

The combustor as in one or more of these clauses, wherein an angle is defined between each oblique portion of the plurality of oblique portions and the axial direction, and wherein the angle is greater than about 40°.

The combustor as in one or more of these clauses, wherein an annular air plenum is defined between the outer band and the bellows wall.

The combustor as in one or more of these clauses, wherein a delimiter extends radially outward from the outer band.

The combustor as in one or more of these clauses, wherein an inlet to the annular air plenum is defined through the delimiter, and wherein an outlet to the annular air plenum is defined through the second end wall.

The combustor as in one or more of these clauses, wherein a conduit extends from the first end plate and defines a fuel inlet, the fuel inlet fluidly coupled to a fuel source and the first fuel plenum.

What is claimed is:

1. A component formed from an additive manufacturing system, the additive manufacturing system having an axial build direction, a radial direction, and a circumferential direction, the component comprising:
    an exterior portion, the exterior portion including a first end wall, a second end wall, and an outer band extending axially between the first end wall and the second end wall; and
    an interior portion disposed within the exterior portion, the interior portion including a self-breaking inner band extending axially between the first end wall and the second end wall, the self-breaking inner band including a first solid portion extending from the first end wall to a perforated portion and a second solid portion extending from the second end wall to the perforated portion, wherein the perforated portion comprises a plurality of teeth disposed between the first end wall and the second end wall.

2. The component as in claim 1, wherein the interior portion and the exterior portion are annular.

3. The component as in claim 1, wherein the perforated portion includes a plurality of walls spaced apart from one another such that circumferential perforations are defined between each adjacent pair of walls of the plurality of walls.

4. The component as in claim 3, wherein the perforated portion further includes a plurality of teeth extending from each wall of the plurality of walls.

5. The component as in claim 4, wherein at least one tooth in the plurality of teeth tapers in thickness as the at least one tooth extends axially from a respective wall of the plurality of walls.

6. The component as in claim 4, wherein each wall and each tooth define a common circumferential thickness that is constant, and wherein each tooth tapers from a first radial thickness at the wall to a second radial thickness.

7. The component as in claim 6, wherein each tooth of the plurality of teeth defines a break off plane, the break off plane having the common circumferential thickness and the second radial thickness, and wherein the common circumferential thickness is between about 100% and about 500% of the second radial thickness at the break off plane.

8. The component as in claim 4, wherein radial perforations are defined between each tooth of the plurality of teeth.

9. The component as in claim 1, wherein the component is a turbomachine component.

10. The component as in claim 9, wherein the turbomachine component is a bundled tube fuel nozzle, wherein the bundled tube fuel nozzle comprises a plurality of tubes and a bellows wall, wherein the plurality of tubes is disposed within the interior portion and extends between the first end wall and the second end wall, and wherein the bellows wall extends between the first end wall and the self-breaking inner band.

11. The component as in claim 1, wherein the plurality of teeth are severable in response to a breaking force such that the self-breaking inner band is transitionable from a connected state to a disconnected state.

12. The component as in claim 1, wherein the outer band and the self-breaking inner band are each a thin-walled cylindrical body.

13. The component as in claim 12, wherein each thin-walled cylindrical body has a wall thickness that is less than 15% of a diameter of the thin-walled cylindrical body.

14. A method of fabricating a turbomachine component using an additive manufacturing system, the method comprising:
    irradiating a layer of powder in a powder bed to form a fused region, wherein the powder is disposed on a build plate;
    providing a subsequent layer of powder over the powder bed by passing a recoater arm over the powder bed from a first side of the powder bed; and
    repeating the irradiating and providing steps until the turbomachine component is formed on the build plate, the turbomachine component comprising:
        an exterior portion, the exterior portion including a first end wall, a second end wall, and an outer band extending axially between the first end wall and the second end wall; and
        an interior portion disposed within the exterior portion, the interior portion including a self-breaking inner band extending axially between the first end wall and the second end wall, the self-breaking inner band including a plurality of teeth disposed between the first end wall and the second end wall.

15. The method as in claim 14, further comprising applying a breaking force to the turbomachine component, whereby the self-breaking inner band is split into a first portion extending from the first end wall and a second portion extending from the second end wall, and wherein a gap is defined between the first portion and the second portion.

16. The method as in claim 14, further comprising subjecting the turbomachine component to a thermal cycle in which a temperature of the one of the exterior portion or the interior portion is raised relative to the other of the exterior portion or the interior portion, whereby the self-breaking inner band is split into a first portion extending from the first end wall and a second portion extending from the second end wall, and wherein a gap is defined between the first portion and the second portion.

17. The method as in claim 14, further comprising subjecting the turbomachine component to an operational cycle within a gas turbine, whereby the self-breaking inner band is split into a first portion extending from the first end wall and a second portion extending from the second end wall, and wherein a gap is defined between the first portion and the second portion.

* * * * *